United States Patent [19]

Morris

[11] Patent Number: 4,614,033
[45] Date of Patent: Sep. 30, 1986

[54] NUT MILL

[76] Inventor: Howard B. Morris, 5451 Fenmere Way, Salem, Oreg. 97310

[21] Appl. No.: 605,617

[22] Filed: Apr. 30, 1984

[51] Int. Cl.⁴ ............................................... A23N 5/00
[52] U.S. Cl. ..................................... 30/120.2; 99/574
[58] Field of Search ................. 30/120.1, 120.2, 120.3, 30/120.4; 99/574, 575, 579, 581, 577

[56] References Cited

U.S. PATENT DOCUMENTS

| | | | |
|---|---|---|---|
| 1,320,968 | 11/1919 | Baudendistel | 99/577 |
| 1,591,251 | 7/1926 | Vaughan | 99/579 X |
| 1,834,347 | 12/1931 | Nixon | 99/581 X |
| 3,540,504 | 11/1970 | Hall | 99/577 |
| 4,438,688 | 3/1984 | Johnson | 99/574 |

*Primary Examiner*—Jimmy C. Peters
*Attorney, Agent, or Firm*—Glen A. Collett

[57] ABSTRACT

A nut mill for cracking the shells of nuts to permit easy removal of the nut meats from the nuts, including a frame mounting a rotatable, substantially cylindrical, multi-sided breaker, and a cracking plate positioned in relation to the breaker to receive a nut therebetween, which, when the breaker is rotated, the nut is compressed and cracked. The cracking apparatus is mounted in a housing which includes a hopper for feeding whole nuts through the cracking apparatus, and a drawer bin for receiving the cracked nuts.

4 Claims, 5 Drawing Figures

U.S. Patent  Sep. 30, 1986  4,614,033
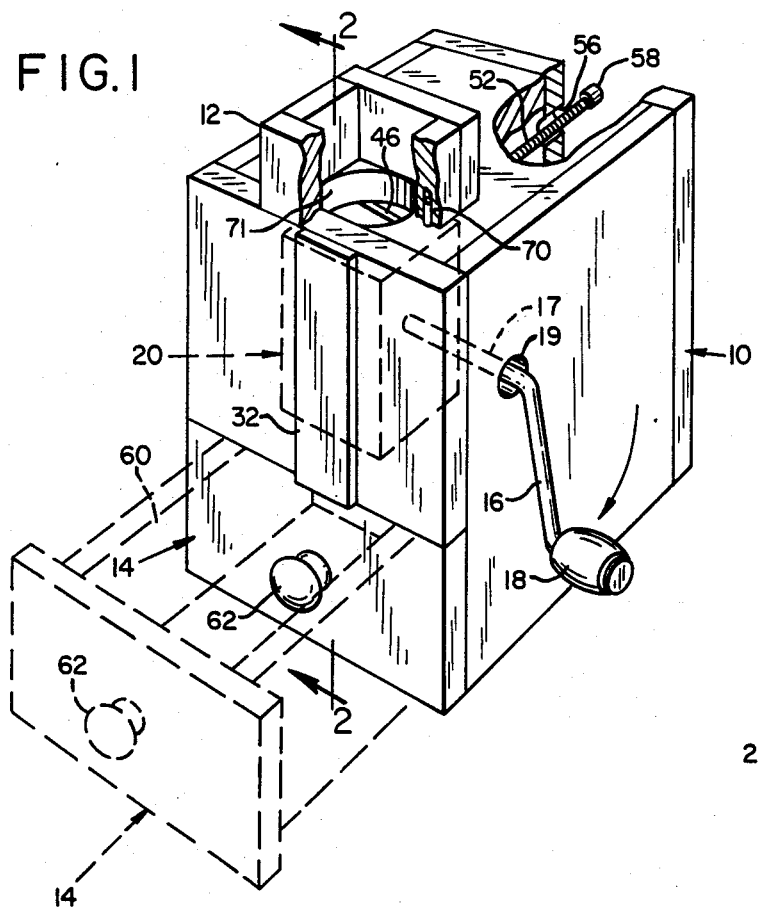
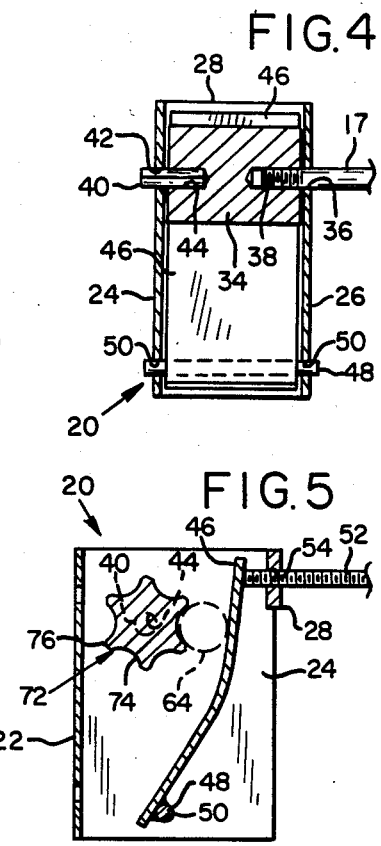
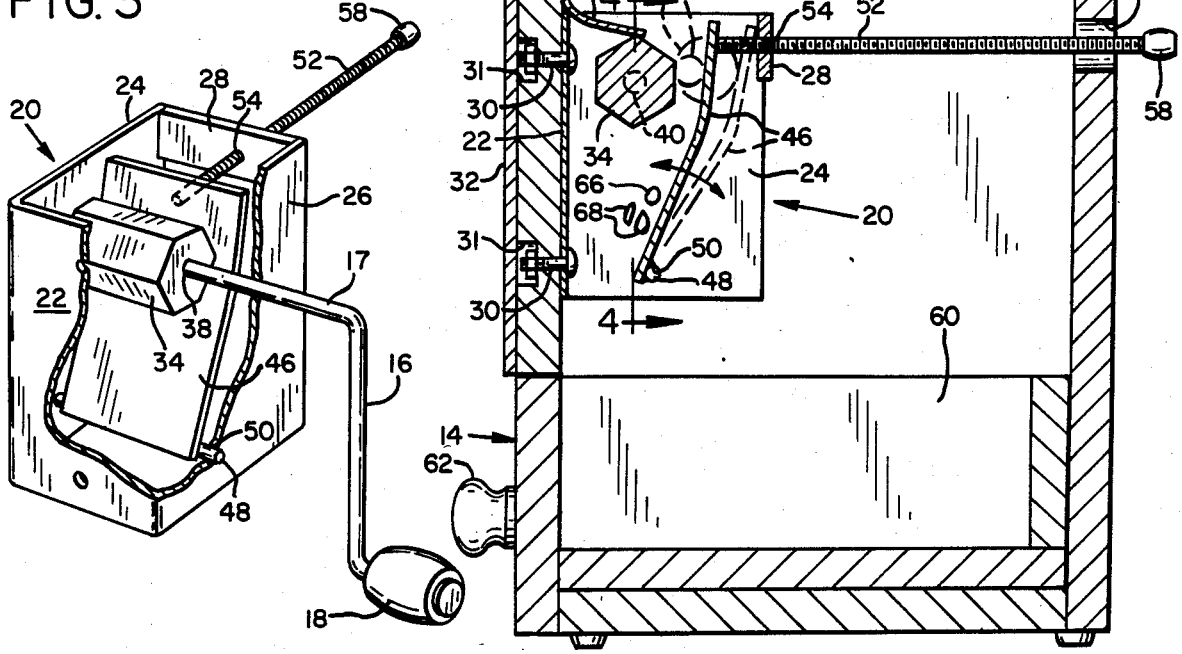

NUT MILL

BACKGROUND OF THE INVENTION

This invention relates to a nut cracking apparatus, and more particularly to a home countertop unit for shelling a quantity of edible nuts quickly and efficiently.

In the past, most home nut cracking has been done by using a pliers-like nutcracker which cracks nuts individually. Other press type devices and those which work on the principle of a vice are also well known. These nutcrackers crack nuts one at a time, which is a laborous and time consuming process in order to acquire any quantity of shelled nut meats.

Commercial nut cracking devices generally involve running the nuts through a series of opposed rollers and then separating out the nut meats. Such large assemblies handle a great quantity of nuts and, of course, are much more complex and expensive than necessary for the home.

Accordingly, it is the general object of the present invention to provide a nut mill for cracking the shells of edible nuts to permit easy removal of the nut meats.

Another object is to provide a nut mill for shelling a medium quantity of nuts for home use.

Yet another object is to provide a hand operated nut mill which is easy and quick to use.

Another object is to provide a nut mill capable of cracking various sized nuts.

Still another object is to provide a nut mill which has an attractive outer case or housing suitable for countertop display.

A further object is to provide a nut mill employing a rotatable, multi-sided breaker which compresses the nuts against a cracking plate.

A still further object is to drop the cracked nuts, including the shells and nut meats, into a drawer which may be removed from the nut mill.

These and other object and advantages, and the manner in which they are achieved, will be made apparent in the following specification and claims, taken in conjunction with the drawings which illustrate the preferred embodiments of the invention.

SUMMARY OF THE INVENTION

In its basic concept, the present invention is a nut mill for cracking the shells of edible nuts to permit easy removal of the nut meats from the nuts, the nut mill including a frame which mounts a rotatable, substantially cylindrical, multi-sided breaker for rotation about its longitudinal axis. The frame also mounts a cracking plate positioned in relation to the breaker to receive a nut therebetween, and being configured so that at least a portion of the length of the cracking plate decreases in distance along the radial dimension from the breaker, so that a nut placed therebetween will crack as the breaker is rotated. Means are provided for rotating the breaker, and also for feeding nuts into the cracking assembly and for receiving the cracked nuts therefrom.

BRIEF DESCRIPTION OF THE DRAWINGS

FIG. 1 is a top perspective view of the nut mill of the present invention, illustrating the housing thereof, parts being broken away to illustrate its construction, and showing the extended position of the drawer in phantom line.

FIG. 2 is a section taken along the line 2—2 of FIG. 1 illustrating the internal construction of the nut mill, as well as the housing thereof.

FIG. 3 is a top perspective view of the cracking assembly of the nut mill of FIG. 1, part being broken away to illustrate its construction.

FIG. 4 is a section taken along the line 4—4 of FIG. 2.

FIG. 5 is an end view of a second embodiment of the breaker, showing an alternate configuration thereof.

DESCRIPTION OF THE PREFERRED EMBODIMENT

The exterior appearance of the nut mill of the present invention is illustrated generally in FIG. 1. The housing 10 is substantially a rectangular cabinet, preferably made of wood for decorative purposes. A hopper 12, which is detachable, sits on top of the housing. In the base of the housing is drawer 14 which collects the cracked nuts, and which can be pulled out to empty the cracked nuts from the nut mill.

The nut mill is preferably powered by a hand crank 16 having a crank handle 18. The crank shaft 17 extends through a hole 19 in the side wall of the housing. The crank is turned in the direction of the arrow to power the cracking assembly.

FIGS. 2 and 3 best illustrate the cracking assembly, shown generally at 20, of the nut mill. A frame includes a channel having a front wall 22 and two opposed side walls 24 and 26. A back strip 28 is mounted between the two side walls.

The frame is bolted by its front wall 22 to the front wall of the housing 10 by bolts 30 which are fitted into countersunk bolt holes 31. A decorative front strip 32 is placed on the housing to cover the bolt holes.

A breaker 34 is rotatably mounted on the frame for rotation about its longitudinal axis. The breaker is preferably a substantially cylindrical, multi-sided portion of a steel bar. Although the breaker may have any of various configurations, it is preferably hexagonal. Square and octagonal shapes have also been demonstrated to work. Side wall 26 of the frame has a hole 36 therein through which the end of crank shaft 17 is extended. The breaker has a hole 38 in its end, along its longitudinal axis. The end of the crankshaft is threaded into the hole 38. The other end of the breaker is rotatably mounted by a roll pin 40 which extends through hole 42 in wall 24 and into hole 44 in the breaker.

A cracking plate 46 is mounted on the frame and positioned in relation to the breaker to receive a nut therebetween. The plate is configured so that at least a portion of the length of the cracking plate decreases in distance along the radial dimension from the breaker. Thus, a nut will be compressed and broken as it is drawn by breaker 34 along the sloping surface of cracking plate 46. Preferably the cracking plate is mounted pivotably in the frame by a rod 48 welded to the plate and engaging holes 50, below the breaker in side walls 24 and 26.

Preferably the cracking plate is adjustably mounted on the frame for varying the distance between the breaker and the cracking plate to accomodate variously sized nuts. An adjusting screw means is provided, preferably comprising threaded adjusting rod 52 which is threaded through a hole 54 in back strip 28 of the frame. Adjusting rod 52 is operable to move cracking plate 46 toward or away from breaker 34. The adjusting rod extends through a hole 56 in the back of the housing and includes a knob 58 on the end thereof. The range of motion is illustrated by the alternate positions in FIG. 2. As shown, the cracking plate is pivoted to the frame at a point below the breaker and extends upwardly to above the breaker, and is slanted away from the breaker in all positions. Thus, gravity will hold the cracking plate spaced-apart from the breaker. Preferably the cracking plate has a bend therein or is curved, with its concave side facing the breaker. This allows the cracking plate to have the proper angle at the point where the nuts engage it.

The bin of drawer 14 is indicated at 60, and it is configured to substantially cover the inside bottom of the housing 10 . Thus, the nut mill could be operated until the drawer was substantially full before emptying it. A knob 62 is provided on the front of the drawer.

Whole nuts, dropped in through hopper 12, are indicated at 64. The nuts are caught on a flat side of breaker 34 and rotated into contact with cracking plate 46, whereupon further rotation compresses the nut between breaker 34 and cracking plate 46. A flexible flap 63 is mounted on the housing and extends to the breaker over the side of the breaker opposite the cracking plate. This directs the nuts into the area between the breaker and the cracking plate. The nut meats or kernels 66 are shelled out of nut shells 68 and fall into a pile in drawer bin 60.

For purposes of storage or shipping, it is desirable to be able to remove hopper 12 from the the top of housing 10. For this purpose, dowels 70 are provided which align the hopper with an opening 71 in the top of the housing over the cracking assembly. Thus the hopper may be removed, and conveniently placed in drawer 14, as desired. For the same purpose it may be desirable to remove crank 16. This can be done by blocking the rotation of breaker 34 and rotating crankshaft 17 counterclockwise to disengage it from the breaker. Breaker 34 remains substantially in place because of roll pin 40.

FIG. 5 illustrates an alternate embodiment of the configuration of the breaker, shown generally at 72. The sides of breaker 72 have depressions 74 therein. This forms points 76 at the corners of the hexagon. Thus the depressions engage and entrap the nuts as they are drawn past the cracking plate. This is especially useful for nuts having somewhat spherical shells.

OPERATION

In order to ready the nut mill of the present invention for cracking nuts, it is necessary to install crank 16 and hopper 12 if they are not already in place. Then adjusting rod 52 is screwed to position cracking plate 46 at the appropriate location for the type of nut to be cracked. This may require trial and error. If the spacing is too small, the nuts will simply rotate on top of the breaker without being drawn through. However, if the spacing is too large the nuts will, of course, just fall through. If any of whole nuts 64 simply fall on through, it is easy to retrieve them from the drawer bin 60 and rerun them through the cracker.

Once the nut mill is set up, a quantity of nuts may be dumped into hopper 12. They pass through opening 71 in housing 10 and encounter the cracking assembly. Flap 63 keeps the nuts from falling behind breaker 34 and directs them between the breaker and cracking plate 46. One at a time, or perhaps more than one at a time depending on the width of the cracking assembly in relation to the size of nut, the nuts are drawn downwardly by the rotating breaker as hand crank 16 is turned. It may be desirable to hold one's hand over the top of the hopper to keep some nuts which may pop out of the cracking assembly from jumping out the top of the hopper.

The side walls 24 and 26 of the cracking assembly closely face the ends of breaker 34 and cracking plate 46 and confine the nuts in the cracking area. Once a nut begins to be drawn down between the breaker and cracking plate it is compressed until broken. Then shell pieces 68 and the nut meats 66 fall into drawer bin 60. Once all of the nuts have been cracked, drawer 14 can be withdrawn from the housing 10 and the nut meats separated from the waste shells. Any whole nuts are simply run back through the cracking assembly, with the cracking plate adjusted a little tighter.

The present invention provides a very simple and useful nut mill for use on a kitchen countertop. Its housing is complimentary as an appliance. Use of the device saves considerable effort over the prior art hand nut-crackers. Further, it is less costly to buy whole nuts than commercially shelled nuts. It is also useful for those who have a substantial quantity of nuts from their own nut trees.

It has been found that a wide variety of nuts can be shelled using the present invention. Almonds and filberts usually come out with whole nut meats. A good percentage of English walnuts are shelled out in halves. Even extremely hard nuts, such as black walnuts and Brazil nuts can be cracked easily.

Having described my invention in its preferred embodiment, I claim:

1. A nut mill for cracking the shells of nuts to permit easy removal of the nut meats from the nuts, the nut mill comprising:
   (a) a frame;
   (b) a rotatable, substantially cylindrical, multi-sided breaker, having from four to eight sides, and being mounted rotatably on the frame for rotation about its longitudinal axis;
   (c) means for rotating the breaker;
   (d) a cracking plate mounted on the frame and positioned in relation to the breaker to receive a nut therebetween, and being condigured so that at least a portion of the length of the cracking plate decreases in distance along the radial dimension from the breaker, for compressing and cracking the nut shell as the breaker is rotated;
   (e) a housing surrounding the frame and means for mounting the frame in the housing, the housing having an opening above the frame for admitting nuts; and
   (f) a flexible flap mounted on the housing adjacent the side of the opening and extending to contact the breaker, to feed the nuts between the breaker and the cracking plate.

2. The nut mill of claim 1 wherein the cracking plate is pivoted to the frame at a point below the breaker and extends upwardly to above the breaker, and is held away from the breaker by gravity.

3. The nut mill of claim 2 wherein the cracking plate is curved with its concave side facing the breaker.

4. The nut mill of claim 1 wherein the sides of the breaker have depressions therein for engaging and entrapping the nuts.

* * * * *